Figure 1:
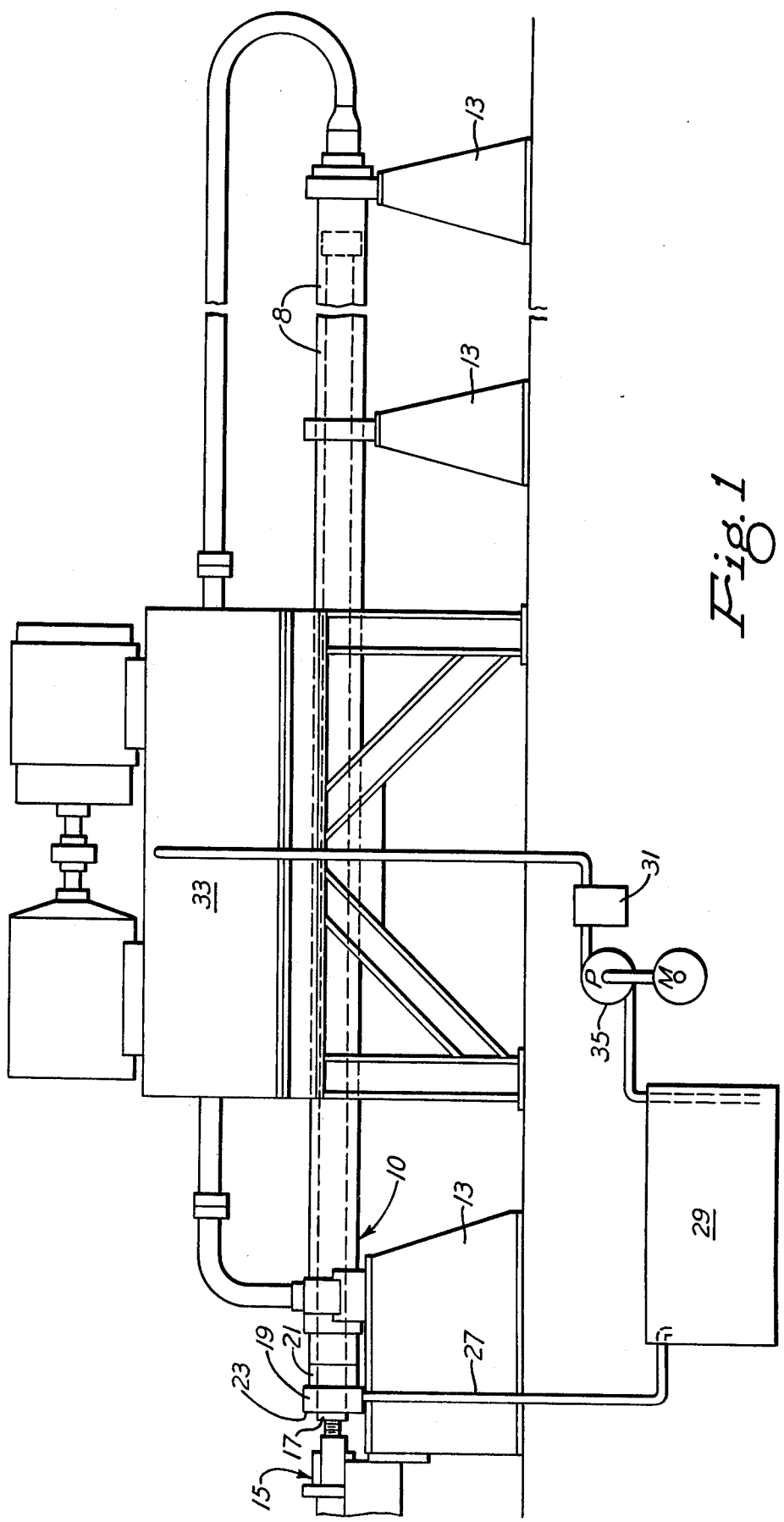

United States Patent [19]
Bartley

[11] 4,055,107
[45] Oct. 25, 1977

[54] APPARATUS FOR REMOVING FLUID IN A PISTON CYLINDER ASSEMBLY

[75] Inventor: William W. Bartley, New Castle, Pa.

[73] Assignee: Wean United, Inc., Pittsburgh, Pa.

[21] Appl. No.: 724,897

[22] Filed: Sept. 20, 1976

Related U.S. Application Data

[63] Continuation of Ser. No. 533,092, Dec. 16, 1974, abandoned.

[51] Int. Cl.² .............................................. F01B 31/00
[52] U.S. Cl. ........................................ 92/86.5; 92/80; 92/168; 277/24; 277/59
[58] Field of Search ................ 92/80, 82, 86, 86.5, 92/166, 168, 87; 277/24, 59, 205

[56] References Cited

U.S. PATENT DOCUMENTS

| | | | |
|---|---|---|---|
| 2,194,732 | 3/1940 | Aikman | 92/168 |
| 2,776,173 | 1/1957 | Rudy | 277/24 |
| 2,979,350 | 4/1961 | Lansky | 277/59 |
| 3,049,370 | 8/1962 | Bertrand | 277/24 |
| 3,521,890 | 7/1970 | Holmes | 277/59 |
| 3,825,270 | 7/1974 | Paramonoff | 277/59 |
| 3,934,311 | 1/1976 | Thompson | 277/59 |
| 3,943,717 | 3/1976 | Schexnayder | 92/86 |

Primary Examiner—Martin P. Schwadron
Assistant Examiner—Abraham Hershkovitz
Attorney, Agent, or Firm—Daniel Patch; Suzanne Kikel

[57] ABSTRACT

This disclosure relates to an apparatus for use with a piston cylinder assembly and includes one or more rod scraper elements employed for the removal and retention of any fluid adhering to the surface of the piston rod during its operation, which fluid if desired may be processed for reuse.

1 Claim, 2 Drawing Figures

APPARATUS FOR REMOVING FLUID IN A PISTON CYLINDER ASSEMBLY

This is a continuation of application Ser. No. 533,092, filed Dec. 16, 1974 now abandoned.

Piston cylinder assemblies are employed in many varied mechanical operations, but for the purpose of illustration its use in a drawbench for the production of tubes and bars has been selected.

Presently, rod scrapers are generally provided for heavy industrial piston cylinder assemblies and are mounted adjacent the outside face of the bore, but these are only employed to prevent foreign matter, such as dust, dirt, contaminants, etc. from being brought into the cylinder on the return of the rod. Their intended purpose is not be remove or retain oil, and therefore, as the rod traverses during its outstroke oil is drawn out of the cylinder. In the case of the drawbench the amount of the oil which escapes can be so great that it may cover a large portion of the external areas of the drawbench and the surrounding work area creating an unsightly and unsafe working condition. Moreover, when it is considered employing a piston cylinder assembly having a 7 inch bore, a 4⅞' inch and a 51 foot stroke performing 40 cycles per hour and 15 turns per week, approximately 1,700 gallons per year of oil may be lost from which it can readily be appreciated that not only is there a considerable amount of oil left to collect around the drawbench but a substantial unnecessary monetary loss is involved as well.

The present invention pertains to an apparatus for removing and retaining oil or the like from a piston rod prior to its leaving the bore of a cylinder in a manner to prevent any appreciable escapement of oil from the rod thereby to provide a clean, safe working area and, if desired, to economize in the use of oil.

Still a further object of the present invention is to provided two rod scrapers mounted in the inner peripheral portion of the cylinder wall of the piston cylinder assembly and located on either side of a circular-shaped recess for receiving oil, and means for directing the oil from the receiving means away from the piston cylinder assembly so that it may be processed and utilized again.

Figure 2:
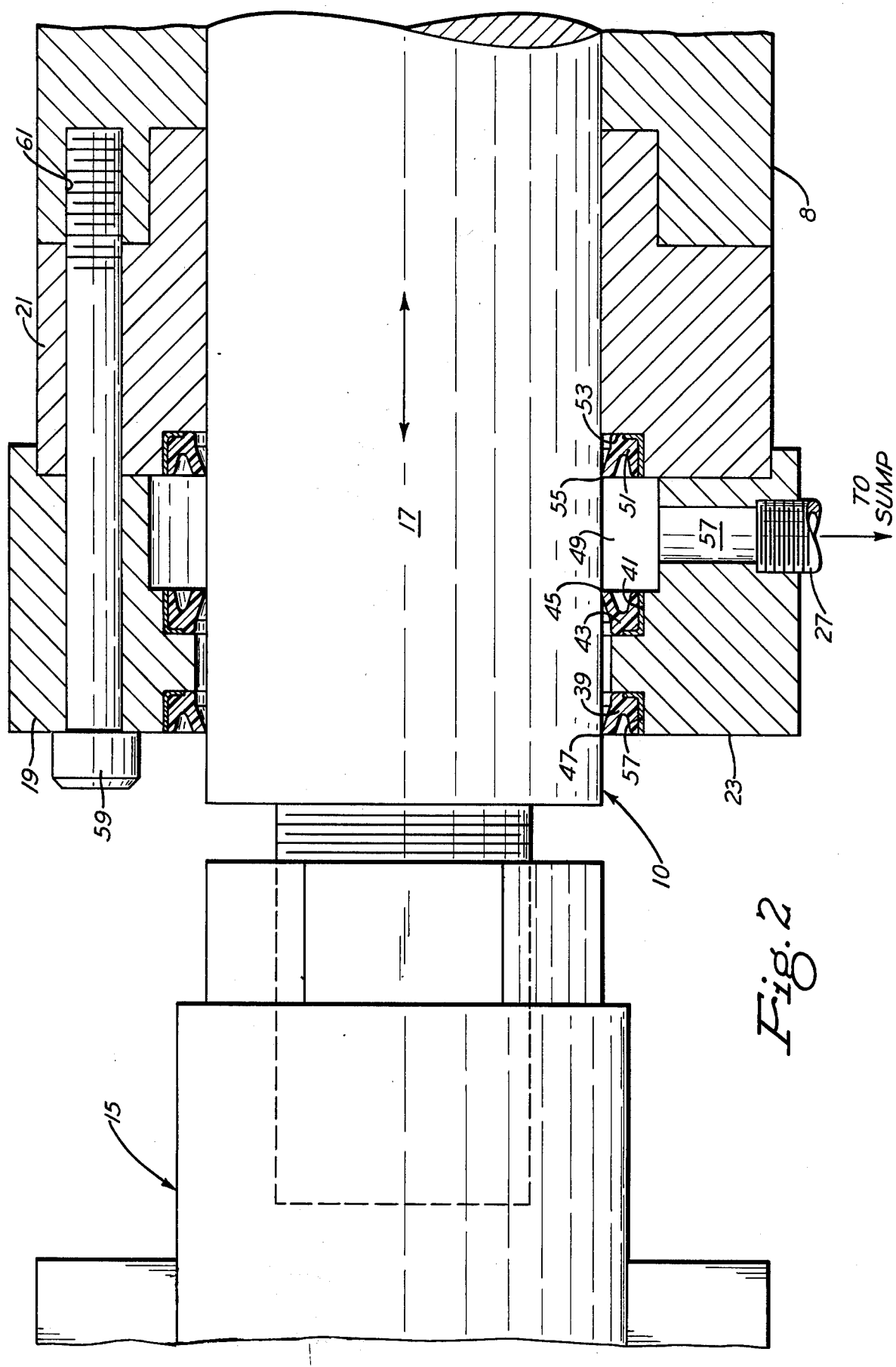

These objects, as well as other novel features and advantages, of the present invention will be better understood when the following description of one embodiment thereof is read along with the accompanying drawings of which:

FIG. 1 is an elevational view of a drawbench depicting an arrangement of the present invention in relation to a piston cylinder assembly of a drawbench; and FIG. 2 is a partial enlarged sectional view of a preferred embodiment of the present invention shown generally in FIG. 1.

In referring first to FIG. 1, it will be appreciated that a cylinder 8 of a piston cylinder assembly 10 is mounted on several spaced support structures 3 and aligned tandemly with a carriage 15, which carriage is connected to a piston rod 17 of the piston cylinder assembly 10, shown best in FIG. 2, and has jaws which horizontally pull material through a die. Only a small portion of the carriage 15 is shown while the jaws and die are not shown at all since their showing is not necessary to understand the present invention. At the front end 23 of the cylinder 8 two circular gland plates 19 and 21 are mounted. The outer plate 19 is greater in diameter than both the plate 21 and the cylinder 8 and is machined to register onto an extending portion of the plate 21 which is better shown in FIG. 2 and which will be discussed more fully later. Connected to the plate 19 is a line 27 which by gravity conveys oil down into a sump 29 from which the oil is taken through a filtering system 31 to the main reservoir 33 by a pump and motor assembly 35.

Referring more specifically to FIG. 2, immediately inside plate 19 a circular opening 37 houses a scraper 39, which takes the same circular form as the opening and which is similar to well-known cylinder scraper devices used in the industry. Parallel to this opening 37 and spaced axially relative thereto another circular opening 41 houses a scraper 43. This scraper 43 is similar in construction to the scraper 39. The lips 45 and 47 of the scrapers 39 and 43 are positioned to extend in opposite directions from each other, the edge of lip 45 pointing to the right as one views FIG. 2; that is, towards the rear of the cylinder 8 and the edge of lip 47 pointing to the left thereof. At 49, a circular-shaped recess acting as a reservoir is situated to the right of the scraper 43. A third scraper 51 is housed in a third opening 53 and is situated to the right of the recess portion 49. Again, this lip 55, as does lip 47, points towards the left. Viewing FIG. 2, one is better able to understand the relationship of the angles of the two lips of the scrapers 43 and 51 and the recess portion 49. Connected to the recess portion 49 is a drilled hole 57 which conveys oil away from the piston cylinder assembly by means of the line 27.

Returning now to the inner plate 21, this plate contains both the opening 53 and the scraper 51. It also is machined to fit into a corresponding machined section of the inner peripheral portion of the cylinder 8 and is secured to the cylinder, along with plate 19, by several bolts, one shown at 59, passing through both plates 19 and 21; the bolts being fastened in threaded holes, one shown at 61, provided in the cylinder. As indicated in FIG. 2, the lips 45, 47 and 55 are arranged so that their outer circular edges engage or assume a very close relationship with the piston rod thereby performing their function as scrapers. At this point, it should be noted that plates 19 and 21 can be easily mounted to existing cylinders as well as to newly manufactured ones. Also, the scrapers may follow the design of several well-known available commercial seals and may be made out of materials such as polyurethane, leather, felt, or neoprene.

A brief description of the invention will now be given. The piston rod 17 is traversed by fluid being introduced at the back of the piston cylinder and pushes the carriage 15 forward to its gripping position. As the piston rod 17 moves into the front end 23 of the cylinder 8 and to the left as one views FIG. 1, oil previously pumped into the front end 23 of the cylinder 8 and which is now being bled away adheres to the outer surface of the piston rod. This oil is continuously removed from the entire periphery of the rod by the lip 45 of the scraper 43 as the rod moves outwardly and directs the oil into the recess portion 49. When the carriage 15 is caused to move through its working stroke by a reverse operation of the piston cylinder assembly 10 and as the piston rod 17 immediately enters the cylinder, the lip 47 will remove any dust and other contaminants from the outer surface of the entering rod. As the returning rod passes through the recess portion 49 any oil that may adhere to its surface will be removed by the lip 55 of the scraper 51 and deposited again into the recess portion. The drilled hole 57 then leads the accumulated oil through the line 27 to the sump, which, in turn, is pumped to a filtering system and re-routed to a main reservoir from which it will be reused. While it will be appreciated that the piston cylinder assembly disclosed employs a moving piston rod, the present invention will be just as useful in the case where the cylinder is moved and the rod is held stationary. It will also be appreciated that in certain applications only the scraper 43 in combination with the recess portion 49 need be employed and the scraper 51 can be omitted.

In accordance with the provisions of the patent statutes I have explained the principle and operation of my invention and have illustrated and described what I consider to represent the best embodiment thereof.

I claim:

1. In a fluid piston cylinder assembly comprising a piston reciprocable relative to a piston cylinder and a piston rod attached to the piston, wherein during its operation fluid is introduced on the piston rod side of the piston wherein fluid adheres to the piston rod upon the relative displacement of the piston rod and piston cylinder, the improvement comprising a fluid removing means having at least two piston rod encircling scraper elements and a fluid receiving means including a piston rod encircling recess, said fluid removing means and said fluid receiving means located on said piston rod said of the piston, said scraper elements each having a varying inner diameter, means for locating one of said scraper elements to remove said adhering fluid from said piston rod during relative movement of said piston rod and said piston cylinder in a first direction, means for locating the other one of said scraper elements to remove said adhering fluid from said piston rod during relative movement of said piston rod and said piston cylinder in a second direction opposite to said first direction and, the inner diameter of said one scraper element decreases to a minimum inner diameter in said second direction so as to remove said adhering fluid on said piston rod upon said in said first direction relative movement, the inner diameter of said other scraper element decreases to a minimum inner diameter in said first direction so as to remove said adhering fluid on said piston rod upon said relative movement in said second direction, means for locating said recess of said receiving means between said minimum inner diameters of said two scraper elements, said recess constructed in a manner to immediately receive said fluid after removal from said piston rod and having different portions contiguous to said minimum inner diameters and having an outer diameter larger than the outer diameter of said scraper elements, said recess having an axial dimension which substantially equals the separation between said minimum inner diameters, gland plate means comprising two separate members, one of which has an annular projection, an opening in said piston cylinder for receiving said projection, said one member including a recess for receiving one of said scraper elements, the other member having an annular projection for contacting with an annular surface formed on said one member, said other member also having a recess for receiving said other scraper element, and being formed with said recess of said fluid receiving means, and means for securing said two members to said piston cylinder.

* * * * *

UNITED STATES PATENT AND TRADEMARK OFFICE
CERTIFICATE OF CORRECTION

PATENT NO. : 4,055,107
DATED : October 25, 1977
INVENTOR(S) : William W. Bartley It is certified that error appears in the above-identified patent and that said Letters Patent are hereby corrected as shown below:

Col. 1, line 16, "is not be" should read -- is not _to_ --

Col. 1, line 38, "provided" should read -- provide --

Col. 4, line 6, "rod upon said in said first direction relative movement" should read -- rod upon said relative movement in said first direction --

Signed and Sealed this

Twenty-third Day of May 1978

[SEAL]

Attest:

RUTH C. MASON
Attesting Officer

LUTRELLE F. PARKER
Acting Commissioner of Patents and Trademarks